Figure 1:
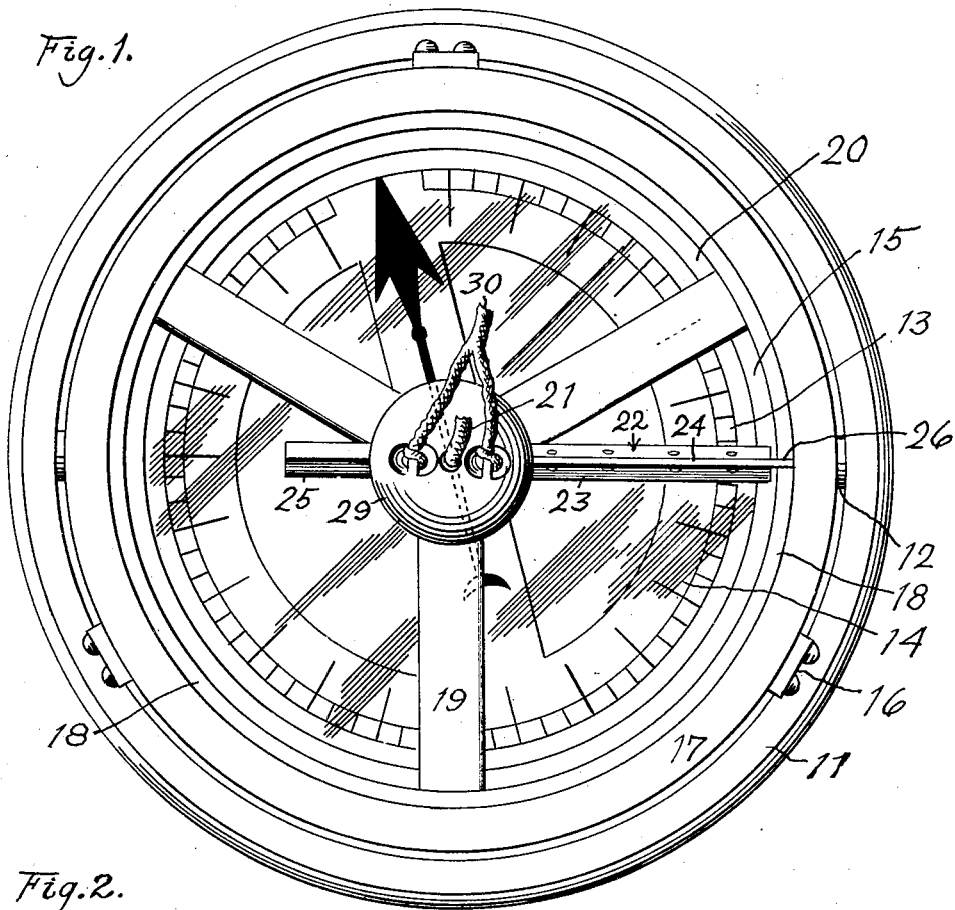

S. SAKAUYE.
SEA CURRENT DIRECTION INDICATOR.
APPLICATION FILED JUNE 19, 1918.

1,336,925.

Patented Apr. 13, 1920.
2 SHEETS—SHEET 1.

INVENTOR:
Suyeji Sakauye
By His Atty.
Edward M. Kojima

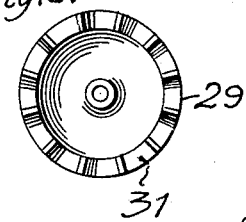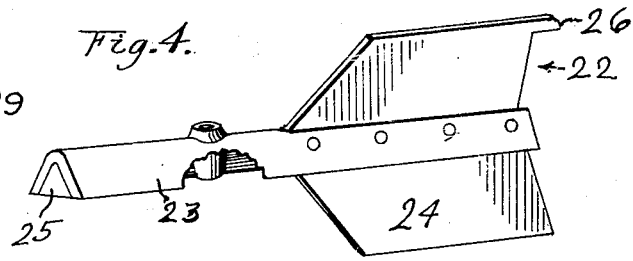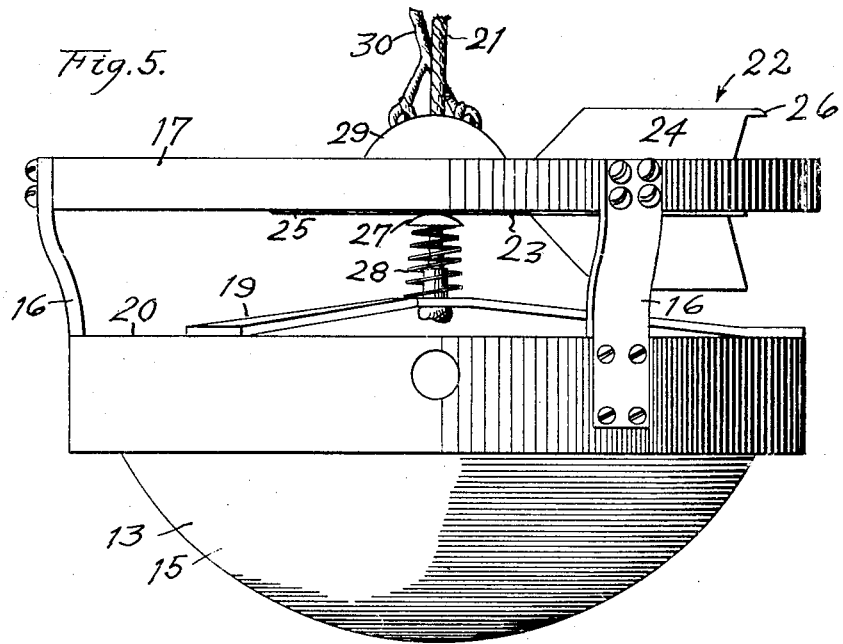

UNITED STATES PATENT OFFICE.

SUYEJI SAKAUYE, OF EAST SAN PEDRO, CALIFORNIA.

SEA-CURRENT-DIRECTION INDICATOR.

1,336,925.  Specification of Letters Patent.  Patented Apr. 13, 1920.

Application filed June 19, 1918. Serial No. 240,777.

*To all whom it may concern:*

Be it known that I, SUYEJI SAKAUYE, a subject of the Emperor of Japan, residing at East San Pedro, in the county of Los Angeles and State of California, have invented a new and useful Sea-Current-Direction Indicator, of which the following is a specification.

The hereinafter described invention relates to an improved means for indicating the direction of the flow of tides and sea currents.

The primary object of the invention is to detect and locate the direction of sea currents, which is of especial advantage prior to the casting of fishing nets in the open sea, and for analogous purposes for which such knowledge would be desirable.

To attain this end I have provided a support member having mounted therein a magnetic compass, and a current detector superposed upon the compass, with means for releasing and retarding the detector when influenced or affected by a sea current.

Figure 2:
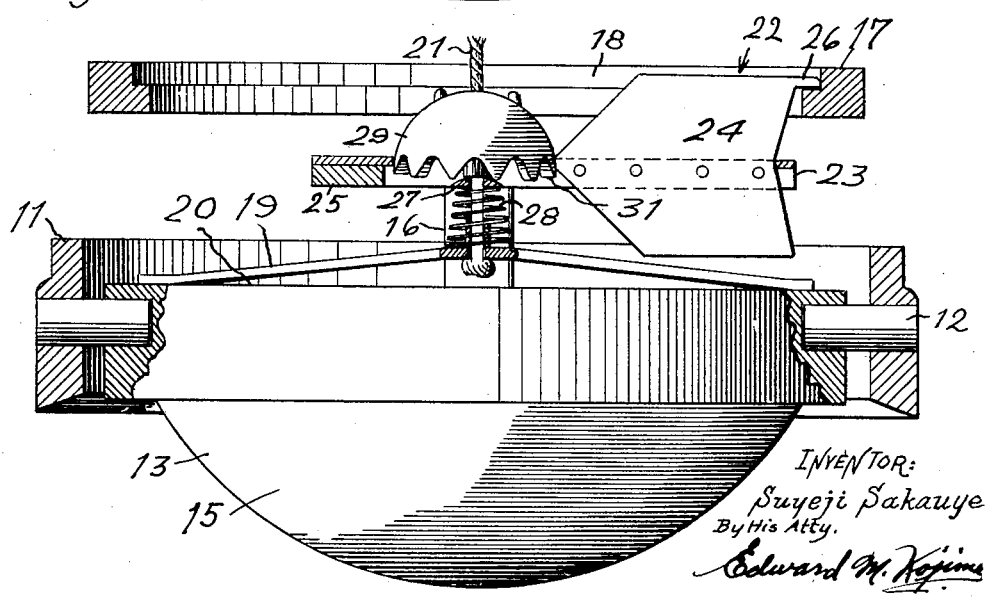

The invention consists of certain parts and details and modifications of the same, as will be hereinafter described and pointed out in the claims, and illustrated in the drawings, in which:

Figure 1 is a top plan view of my improved current direction indicator. Fig. 2 is a side elevation of the same, with certain of the parts in section. Fig. 3 is a bottom plan view of the retaining weight member. Fig. 4 is a perspective view of the indicator shaft and vane. Fig. 5 is a side elevation of the device.

Referring to the drawings, my improved direction indicator consists of a bouyant member 11, provided with trunnions 12, on which is mounted the magnetic compass 13, which is provided with an annular indicating member 14, and a container 15. The compass may be of any preferred form of construction, and no specific claim is made thereto. Supporting members 16, extending upward from the compass, carry an annular ring 17, provided with an inner annular groove 18. A bridge element 19 is secured to the upper face 20, of the compass, and at the center thereof is secured the cable 21, by which the compass may be suspended from a ship, and into the water. A current indicator 22, consisting of the angular shaft 23 is pivotally mounted on the cable 21, and also the metallic vane 24, all preferably constructed of a metal that will not affect the magnetic needle in the compass. The shaft 23 is provided with a weighted end 25, to counterbalance the vane 24. A lug 26, on the vane is adapted to engage with the annular groove 18. An anti-friction disk 27 is mounted on the cable 21 beneath the angular shaft 23, and a spring 28 is interposed between the disk and the bridge element 19, said spring serving to raise the indicator when released by the weight 29. The retaining weight 29 has attached thereto, a cord 30, which is adapted to extend adjacent to the cable and to the deck of the ship, so that the operator may release and retain the indicator in position. The weight 29 is provided on the bottom with an annular notched flange 31, adapted to engage with the angular and correspondingly formed shaft 23. The annular ring 17, is constructed preferably of a bouyant material, such as wood. The weight 29, and spring 28, are preferably made of a metal which will not affect the compass.

In use, the device is suspended from the deck of a ship and into the water; the device being raised and lowered by cable 21. The weight 29 is then raised sufficiently to release the current indicator 22, which is then free to turn in a swivel movement on the cable. If affected by a current in the water, the indicator will gradually assume a position indicating the direction of flow of the ocean current, or tide, as the case may be, while the compass will be affected by magnetic influence to indicate the polar direction. The weight 29 is then lowered into contact with the indicator which drops into engagement with the annular ring 17. The indicator is thus retained in its relative position with the compass, and, when raised to the surface, the direction may be read by the operator, and the flow of the sea or ocean current is thus ascertained.

While simple and efficient means are herein provided for accomplishing the objects of the invention, and the elements shown are well adapted to serve the purposes for which they are intended, it is to be understood that the invention is not limited to the precise construction exhibited in the drawings, but may include within its purview such changes, alterations, and modifications, as may fall within the scope of the appended claims, my invention comprising a compass, and movable current indicator elements associated therewith, and means for retaining the indicator elements in indicating position.

What is claimed is:

1. The combination with a compass, of supporting members extending upward therefrom, an annular grooved ring carried by the supporting members, a bridge element secured to the compass, a cable acting for suspension, secured to the bridging element, a current indicator swivelly mounted on the cable, a weight to retain the current indicator in engagement with the annular ring, and a cord attached to the retaining weight for placing the same in operative and inoperative position.

2. The combination with a polar compass, of a ring supported relatively above the compass, ocean current indicating means swivelly mounted relative to the polar compass and adapted to indicate the flow of current, means to retain the ocean current indicating means in engagement with the ring and movable to operative and inoperative position, and means for actuating the retaining means to operative and to inoperative position.

3. The combination with a compass, of an ocean current indicating means, adapted under influence, to assume a direction parallel with the flow of current, releasable weight retaining means for the current indicating means maintaining the same in assumed position relative to the compass, and spring means to disengage the indicating means from the compass, when released by the retaining means.

4. The combination with a support member adapted to float upon the water, of a magnetic compass pivotally mounted within the limits of the support member, a ring mounted above the compass, ocean current indicating means superposed relative to the compass, retaining means for the indicating means serving to hold the same in engagement with said ring, and releasing means for the retaining means.

5. The combination with a support member adapted to float upon the water, of trunnion members projecting inwardly therefrom, a compass mounted on the trunnion members, an annular ring superposed relative to the compass, an ocean current indicator free to swing radially within the limits of the ring, means for holding the indicator in engagement with the ring, and means for releasing the retaining means.

6. The combination with supporting means, of a compass mounted within the supporting means, and independently movable relative to the supporting means to normally maintain a level position, an annular float ring supported in superposed position above the compass, a bridge element secured to the compass, a cable secured to the bridge element, an ocean current indicator swivelly mounted upon the cable, an anti-friction disk beneath the indicator, a spring interposed between the disk and the bridging element, and adapted to release the indicator from engagement with the annular ring, and retaining means for the indicator after it has assumed the indicating position.

7. The combination with a supporting frame, of a sea current direction indicator carried thereby and adapted to assume a direction parallel with the flow of the current, means normally retaining the indicator in contact with the supporting frame, releasing means for the retaining means, and polar direction indicating means associated therewith.

8. The combination with supporting means, of a compass carried thereby and having a magnetic needle, suspension means for the compass, and current indicating means associated with the compass, said compass needle and current indicating means being freely revoluble in independent paths of movement, and means for clamping the current indicating means in position relative to the compass after assuming the indicating position.

9. The combination with supporting means, of a compass carried thereby, suspension means for the compass, a current indicator swivelly mounted relative to the suspension means, an angular shaft for the indicator, a retaining weight for the angular shaft provided on its underside with corresponding notches to engage the shaft, and a cord for releasing the weight from the shaft.

10. The combination with supporting means, of a compass carried thereby, and an ocean current indicator associated with the compass and composed of non-magnetic metals, said indicator being counterbalanced for free turning movement, retaining means for the indicator effective after assuming its indicating position, and releasing means for the retaining means relative to the compass.

In testimony whereof I hereunto affix my signature this 12th day of June, 1918.

SUYEJI SAKAUYE.

In presence of—
FREDERIC M. KEENEY,
J. W. MASTER.